United States Patent Office 2,824,840
Patented Feb. 25, 1958

2,824,840

LUBRICATING OIL COMPOSITION

Edward P. Cashman, Bayonne, N. J., and Ethel J. Corcoran, New York, N. Y., assignors to Esso Research and Engineering Company, a corporation of Delaware No Drawing. Application April 1, 1953
Serial No. 346,287

10 Claims. (Cl. 252—56)

The present invention relates to improved lubricating oils and to novel chemical products useful as additives for such oils. More particularly, the invention refers to lubricating oils having low pour points and to certain polymeric ester materials useful as pour depressant additives for such oils.

In brief compass, the invention pertains to high molecular weight oil-soluble polymerization products containing as an element a complex ester of an unsaturated dibasic acid with a dihydric alcohol and a high molecular weight monohydric alcohol and to lubricating oils containing such products. The polymerization products may be either straight polymers of these complex esters or copolymers of such complex esters with simple esters.

Polymers and copolymers of esters of unsaturated dibasic esters have been made and used heretofore as pour depressants for lubricating oils. However, many of the known additives of the ester polymer type are deficient with respect to one or more important properties, such as activity as viscosity index improvers, pour depressant property, etc. The present invention supplements this group of materials by products of satisfactory pour depressing and pour stability characteristics.

In accordance with the invention, the pour characteristics of lubricating oils are improved by adding thereto minor amounts of an oil-soluble polymerization product containing a complex ester of an unsaturated dibasic acid as an element. Complex esters suitable for the purposes of the invention are made by reacting two moles of an alpha,beta-ethylenically unsaturated dibasic acid, preferably fumaric acid, with one mole of a glycol to form a half ester and further reacting the half ester with two moles of a long chain monohydric alcohol to esterify the terminal carboxyl groups. The reactions involved may be typified by the following equations:

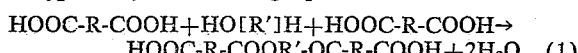   (1)

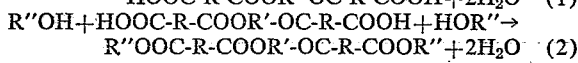   (2)

wherein R is an unsaturated aliphatic hydrocarbon radical having 2–5 carbon atoms and at least one double bond; R' is

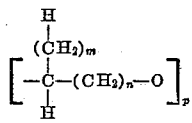

where $m$ is an integer from 0 to 10; $n$ is an integer from 1 to 10; and $p$ is an integer from 1 to 5; and R" is a hydrocarbon radical having about 8–20 carbon atoms.

Complex esters of this type form the basis of the pour depressants of the invention. Satisfactory pour depressants may be made in accordance with the invention by polymerizing complex esters of the type described above to form straight complex ester polymers having molecular weights of at least 1000 and preferably of about 2,000 to 30,000. However, pour depressants of superior quality are obtained when the above described complex esters are copolymerized with simple esters particularly diesters of unsaturated dibasic acids with monohydric long chain alcohols, preferably the dibasic acids and monohydric alcohols used in forming the complex ester. Other simple esters, such as vinyl acetate, vinyl butyrate, vinyl octoate, vinyl laurate, vinyl stearate, vinyl esters of coconut oil acids, the corresponding allyl esters, allylidene diacetate etc., may also be used in combination with the above described complex esters to form the copolymers of the invention.

Unsaturated dibasic acids suitable for producing the complex and simple esters required include maleic, itaconic, citraconic, mesaconic, aconitic, and similar acids in addition to the preferred fumaric acid. Examples for glycols are ethylene glycol, polyethylene glycol, propylene, glycol, di-, tri-, and tetrapropylene glycol, trimethylene glycol, butylene glycol, octylene glycol, etc. The monohydric alcohols may be individual alcohols, such as decyl, lauryl or tetradecyl alcohol. However, mixtures of two or more alcohols having an average number of carbon atoms ranging from 8 to about 18 and preferably averaging about 10–14 carbon atoms per molecule may also be employed in building up the complex ester.

A particularly suitable commercially available monohydric alcohol product is that made by hydrogenation of coconut oil and sold under the trade name "Lorol." This material is a mixture of saturated straight chain alcohols having from about 10–18 carbon atoms per molecule, lauryl alcohol with 12 carbon atoms per molecule forming a major proportion of the mixture. Similar commercial products which are sold under the trade names "Lorol B" and "Lorol R" may likewise be used. The approximate composition of these materials is tabulated below.

COMPOSITION OF MIXTURES OF COMMERCIAL ALCOHOLS

| (Trade Name) | Lorol, Weight, Percent | Lorol B, Weight, Percent | Lorol R, Weight, Percent |
|---|---|---|---|
| Component: | | | |
| $C_{10}$ Alcohol | 4.0 | 3.0 | 1.0 |
| $C_{12}$ Alcohol | 55.5 | 46.0 | 85.0 |
| $C_{14}$ Alcohol | 22.5 | 24.0 | 13.0 |
| $C_{16}$ Alcohol | 14.0 | 10.0 | |
| $C_{18}$ Alcohol | 4.0 | 17.0 | 1.0 |
| Average Number of Carbon Atoms | 12.8 | 13.5 | 12.3 |

Other alcohols may be used such as octyl, decyl, cetyl, octadecyl, as well as other mixtures such as a mixture of octyl or decyl with cetyl or octadecyl, and a mixture of $C_8$, $C_{10}$, $C_{12}$, $C_{14}$, $C_{16}$ and $C_{18}$ alcohols having an average in the $C_{11}$–$C_{14}$ range. Even some of the alcohols having less than 8 carbon atoms, e. g., hexyl, amyl, or even lower may be used, providing that a sufficient amount of higher alcohols having, for instance, 12 to 18 carbon atoms, are also used to make a total mixed alcohol product averaging at least as high as 8 carbon atoms and preferably averaging about 10 to 14 carbon atoms. When the alcohols in the fumarate ester average above about $C_{12}$, for example About $C_{13.5}$ as in Lorol B, the copolymers are pour depressants as well as V. I. improvers. Shorter alcohols, for example decyl and octyl in the fumarate ester give copolymers which are exceptional V. I. improvers, but have little or no pour depressant action in most mineral oils.

Complex ester monomers suitable for the formation of polymer type pour depressants are easily prepared by direct esterification of 2 moles of dibasic acid with 1 mol of glycol followed by further esterification with two mols of monohydric alcohol in any manner known per se. For example, the fumaric acid and glycol may be refluxed together with a water carrier, such as toluene, xylene, hexane, heptane, octane, etc., and a catalyst until an amount of water corresponding to the formation of the half ester has been removed. Thereafter the monohydric alcohol is added and the mixture is further refluxed until esterification of the acid is substantially complete as determined by the amount of water liberated, or by the neutralization numbers on reaction mixture. Normally a neutralization number of less than 5 denotes substantial completion of the reaction. In this reaction, some simple ester, i. e. a diester of the dibasic acid with the monohydric alcohol, is also formed. This simple ester may be removed by fractional distillation, if desired.

When mixed monomers consisting of complex ester and simple ester of the dibasic acid are desired, no fractionation of the simple ester from the above complex ester-simple ester mixture is necessary and an excess of dibasic acid over that required to esterify the glycol is used while adding sufficient monohydric alcohol to esterify the free carboxyl groups of the glycol half ester as well as the dibasic acid not taken up by the glycol. Of course, the complex ester and the simple ester may also be prepared independently in a substantially pure state and mixed in proper proportions for copolymerization. This method will be used particularly if the acid and/or alcohol of the simple ester component differ from those forming the complex ester component.

The proportions in which the two ester types, namely the complex and simple esters, are copolymerized, may be varied over a fairly wide range. For example, ester mixtures containing 20–80% complex esters and 80–70% simple esters may be used. The preferred range is 35–70% complex ester and 30–65% simple ester.

Polymerization of the complex ester or mixtures of complex esters with simple esters is generally carried out with peroxide catalysts, such as benzoyl peroxide, acetyl peroxide, t-butyl hydroperoxide, t-butyl perbenzoate, etc. Temperatures in the range of 50°–120° C. are suitable in the presence of 0.1–5.0% by weight of catalyst and for reaction times of about 4–10 hours. The polymerization may be carried out in an inert atmosphere of nitrogen or $CO_2$. If desired, an inert solvent, such as mineral oil or light hydrocarbon solvent, naphtha or carbon tetrachloride, may be employed to control the molecular weight of the polymer.

The polymers and copolymers of the invention may be used as lubricating oil additives in concentrations of about 0.01–1 wt. percent or more, specific proportions depending on the major effect contemplated. For example, relatively small proportions of about 0.02 to 0.5 weight percent may be used if the materials are used as pour point depressants only, while higher concentrations of, say, about 1 to 10 weight percent may be required to obtain an appreciable V. I. improvement.

The lubricating oils to be improved by the polymers of the invention are primarily paraffinic type oils requiring pour depressants. Other materials to which the products of the invention may be added with advantage include soap-thickened greases, paraffin wax, paraffinic diesel fuel and similar oil stocks requiring pour depressing.

Other conventional additives may be added to the oils containing the products of the invention. Such other additives may include dyes, anti-oxidants, extreme pressure agents, rust inhibitors, as well as other pour depressants or other V. I. improvers, as will be understood by those skilled in the art.

The invention will be best understood from the following specific examples.

Example I

A complex ester was prepared from the following reactants:

622 grams (3 mols) Lorol B alcohol
348 grams (3 mols) fumaric acid
219 grams (1.5 mols) octylene glycol
3.5 grams sodium bisulfate (catalyst)
30 ml. toluene (water carrier)

The fumaric acid, octylene glycol, catalyst and water carrier were charged to a glass reactor equipped with thermometer, mechanical agitator, reflux condenser, and water decanter. The reaction mixture was refluxed and water of esterification was withdrawn from the decanter. When 54 ml. of water were removed the Lorol B alcohol was charged to the flask and reflux continued. When a total of 107 ml. of water was removed, the reaction was stopped. The product was washed with sodium carbonate to remove residual acidity and then with water to remove traces of carbonate. The complex ester was recovered by stripping under vacuum (50 mm. mercury) at 200°–220° F.

100 grams of the above prepared complex ester was polymerized at 180° F. for 5½ hours using benzoyl peroxide as catalyst. The resultant polymer was diluted with 400 grams of a solvent extracted, paraffinic-type low volatility, high V. I. mineral oil having a viscosity of 58 SSU at 210° F.

Example II

A mixture of the complex ester of Example I and the simple ester Lorol B fumarate was prepared from the following reactants:

830 grams (4 mols) Lorol B alcohol
348 grams (3 mols) fumaric acid
146 grams (1 mol) octylene glycol
3.5 grams sodium bisulfate
30 ml. toluene The fumaric acid, octylene glycol, toluene, and sodium bisulfate were charged to the reaction flask. The reaction mixture was refluxed, and water of esterification separated from the reflux stream. When 36 ml. of water were removed, the Lorol B alcohol was charged to the reaction, and the esterification continued until a total of 108 ml. of water of esterification were removed. The mixture of esters was recovered as in Example I.

100 grams of the above product was polymerized for 5 hours at 180° F. using benzoyl peroxide as catalyst. The resultant copolymer was diluted with 400 grams of the mineral oil used in Example I.

The properties of the polymer products of the above examples are compared in the table below with the properties of a simple Lorol B fumarate polymer.

| Inspection | Example I | Example II | Simple Lorol B Fumarate Polymer |
|---|---|---|---|
| Viscosity, SSU @ 210° F., 20 wt. Percent to Typed Mineral Oil of Examples I and II | 86 | 98 | 82 |
| | ASTM Pour Point, ° F. | | |
| Percent Active Ingredient in S. A. E. 10 Grade Test Oil "A" [1]: | | | |
| 0.16 | −15 | −15 | |
| 0.125 | | | −10 |
| 0.12 | −15 | −10 | |
| 0.10 | −10 | −10 | −5 |
| 0.05 | +10 | −5 | +15 |
| Percent Active Ingredient in S. A. E. 10 Grade Test Oil "B" [2]: | | | |
| 0.16 | −5 | −20 | |
| 0.125 | | | −10 |
| 0.12 | 0 | −20 | |
| 0.10 | | −20 | −10 |
| 0.05 | +20 | −5 | −5 |

[1] Highly dewaxed Mid-Continent lubricating oil base stock; ASTM pour Point +30° F.
[2] Lightly dewaxed Mid-Continent lubricating oil base stock; ASTM pour point +25° F.

It is seen that the straight complex ester polymer (Example I) has adequate ASTM pour depressant properties. The copolymer of Example II is a better pour depressant than either the complex ester polymer of Example I or the simple Lorol B fumarate polymer.

*Example III*

The following proportions of material were used:

100 grams complex ester from Example I
10 grams vinyl acetate
5 grams mineral oil (same as used in Example I)
1.7 grams benzoyl peroxide The complex ester and vinyl acetate were copolymerized in the presence of the oil as solvent for 5½ hours at 180° F., using benzoyl peroxide as catalyst. The resultant polymer was diluted with the mineral oil used in Example I to a 20 weight percent copolymer-in-oil blend. When 1.0% of this blend (0.2 wt. percent active ingredient) was added to S. A. E. 10 Grade Test Oil "A," the resultant blend had an ASTM pour point of −15° F.

*Example IV*

A material having the properties listed below was prepared substantially as described in Example II.

Viscosity, SSU @ 210° F. (20 wt. percent in mineral oil) ------------------------------- 120

Percent active ingredient in SAE–10 grade test oil "A":

ASTM pour point, ° F.
0.16 ------------------------------------- −15
0.125 -------------------------------------
0.12 ------------------------------------- −10
0.10 ------------------------------------- −10
0.05 ------------------------------------- 0

Percent active ingredient in SAE–10 grade test oil "B":
0.16 ------------------------------------- −20
0.125 -------------------------------------
0.12 ------------------------------------- −15
0.10 ------------------------------------- −10
0.05 ------------------------------------- 0

The pour stability properties of this material were tested at widely separated geographical locations during the winter months. The test oil comprised an acid treated paraffinic distillate plus 3.5% Pennsylvania Bright Stock (vis. @ 210° F. SSU=44). The material was tested at 1.0 wt. percent of a 20% blend in the test oil. In the pour stability test used the samples are stored in the open in pint bottles, ¾ full, and the state of fluidity is observed every working day at about the same time of day for about 3 months at the prevailing atmospheric temperature. Pour stability rating is defined as the percentage of observations below +30° F. at which a sample is fluid. The results of this winter field testing are summarized below.

| Sample | Overall Field Pour Stability Rating |
|---|---|
| Sample of Example IV | 99.2 |
| Commercial Wax-Naphthalene Polymer Pour Depressant | 64.5 |
| Mixed Wax-Naphthalene-Ester Polymer Pour Depressant | 85.9 |

The superior pour stability of the additive of the invention is evident.

The invention is not limited to the specific figures of the foregoing examples. The relative proportions of the constituents may be varied within the limits indicated to obtain products of varying characteristics.

What is claimed is:

1. A lubricating oil composition comprising a major proportion of a lubricating oil and a minor pour depressing amount of an oil-soluble polymeric material having a molecular weight of at least about 1000 selected from the group consisting of (1) polymers of a complex ester, (2) copolymers of said complex ester with a diester and (3) copolymers of said complex ester with vinyl acetate, said complex ester being prepared by esterifying 2 moles of an alpha, beta unsaturated dicarboxylic acid having 4 to 7 carbon atoms per molecule with 1 mole of a glycol having the formula

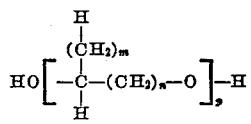

where $m$ is an integer from 0 to 10; $n$ is an integer from 1 to 10 and $p$ is an integer from 1 to 5, to form a partial ester and then completely esterifying said partial ester with 2 moles of substantially saturated aliphatic monohydric alcohol having about 8 to 20 carbon atoms per molecule to form said complex ester, said diester being derived from an acid and a monohydric alcohol each as defined above, said copolymers containing at least about 20% by weight of the complex ester component.

2. A composition according to claim 1 in which said polymeric material has a molecular weight of 2,000 to 30,000.

3. A composition according to claim 1 in which said copolymers contain about 35 to 70% of said complex ester.

4. A composition according to claim 1 in which said minor amount is about 0.01 to 10% by weight based on the total composition.

5. A composition according to claim 1 in which said complex ester and said diester are derived from the same acid and same monohydric alcohol.

6. A composition according to claim 1 in which said acid is fumaric acid.

7. A composition according to claim 1 in which said glycol is octylene glycol.

8. A composition according to claim 1 in which said monohydric alcohol is a mixture of saturated alcohols obtained by hydrogenation of coconut oil and averages about 10 to 14 carbon atoms per molecule.

9. A lubricant comprising a major proportion of a mineral lubricating oil and about 0.01–1.0 wt. percent of a polymer having a molecular weight of about 2000–30,000 of a complex ester prepared by esterifying 3 moles of fumaric acid with 1.5 mole octaylene glycol to form a partial ester and then completely esterifying said partial ester with 3 moles of a hydrogenated coconut alcohol mixture averaging about 13.5 carbon atoms per molecule.

10. A lubricant comprising a major proportion of a mineral lubricating oil and about 0.01–1 wt. percent of a copolymer prepared by esterifying 3 moles of fumaric acid with 1 mole of octylene glycol to form a mixture of partial ester and unreacted fumaric acid, and then completely esterifying said mixture with 4 moles of a hydrogenated coconut alcohol mixture averaging about 13.5 carbon atoms per molecule and polymerizing the ester mixture formed to a molecular weight of about 2000–30,000.

References Cited in the file of this patent

UNITED STATES PATENTS

| 2,392,621 | Strain | Jan. 8, 1946 |
| 2,415,366 | Muskat | Feb. 4, 1947 |
| 2,423,042 | Muskat | June 24, 1947 |
| 2,497,433 | Blake | Feb. 14, 1950 |
| 2,623,036 | Neher | Dec. 23, 1952 |
| 2,624,754 | Blake | Jan. 6, 1953 |
| 2,628,974 | Sanderson | Feb. 17, 1953 |